United States Patent Office 3,529,966
Patented Sept. 22, 1970

3,529,966

MATERIAL AND PROCESS FOR THE PREPARATION OF PLANOGRAPHIC PRINTING PLATES

Heinz Herrmann, Wiesbaden-Biebrich, and Manfred Hahn, Ingelheim, Germany, assignors to Kalle Aktiengesellschaft, Wiesbaden-Biebrich, Germany, a corporation of Germany No Drawing. Filed Jan. 9, 1967, Ser. No. 607,897
Claims priority, application Germany, Jan. 10, 1966, K 58,104
Int. Cl. G03f *7/02;* G03c *5/00, 1/68*
U.S. Cl. 96—33 5 Claims

ABSTRACT OF THE DISCLOSURE

The invention relates to a new material and a new process for the preparation of printing plates. In the present invention, it has been found that coatings containing acid-curable resins and iodine in an uncombined form or in the form of alkali metal iodide are suitable for the preparation of photomechanical printing plates. When image-wise exposing such a coating and subsequently heating it, the unexposed areas of the coating are hardened more intensively than the exposed areas. By means of a suitable solvent, the less hardened, i.e. the exposed, areas of the coating then may be removed. When using a coating support which is known to be suitable, the support may be further processed together with the residual image thereon of the prior coating to give a printing plate, e.g. an offset plate. From a positive original, there is obtained a positive copy.

It is known to use for this purpose copying coatings which contain, as light-sensitive material, gelatin mixed with bichromate. Instead of bichromate, diazo and azido compounds also have been used. Later, coatings which contained diazo compounds and were free from colloids were used. Also known are copying coatings containing unsaturated compounds which polymerize in the presence of light. A further group comprises coatings having different electrical conductivity in the dark and in the presence of light which printing plates, the so-called electrophotographic printing plates, also have been prepared.

The present invention provides a light-sensitive material comprising a light-sensitive copying coating on a support in which the copying coating contains an acid-curable resin and iodine in an uncombined form or in the form of alkali metal iodide. Lithium iodide and sodium iodide preferably are employed because of their better solubility in organic solvents, but satisfactory results also are obtained when using potassium iodide.

The present invention also provides a process for the preparation of printing forms from a material comprising a light-sensitive reproduction coating on a support in which the copying coating contains an acid-curable resin and iodine in an uncombined form or in the form of alkali metal iodide and is image-wise exposed. The coating then is heated to 60° C. to 160° C. and the exposed areas of the coating then are removed from the support by means of a solvent in which the resin is soluble.

For the preparation of the copying coating, resins are suitable which are soluble in solvents and which, as a result of the addition of small amounts of acid, are capable of being converted into products which are only difficulty soluble, or are insoluble, in the solvent in which they previously were soluble. Such resins principally are the condensates of formaldehyde, but also of other aldehydes or of ketones, with urea, with melamine, or with phenols. The thus soluble condensates of the aldehyde with phenols are known as resols. As is known, they are prepared by condensing the condensation reactants under alkaline conditions and have methylol groups. The phenol serving for the preparation of a resol, in addition to unsubstituted phenol, also may be, for example, cresol, xylenol, ethyl phenol, butyl phenol, isopropyl methoxyphenol, chlorophenol, resorcinol, hydroquinone, naphthol or 2,2-bis-(p-hydroxyphenyl)-propane. Examples of aldehydes to be used for condensation, in addition to formaldehyde, are acetaldehyde, acrolein, crotonaldehyde and furfural. Instead of aldehydes, there also may be used aldehyde liberating compounds, e.g. hexamethylene tetramine 1,3,5-trioxane and paraformaldehyde.

The resins used and the iodine are dissolved in organic solvents, such as alcohols, ketones, ethers, esters, hydrocarbons, halogenated hydrocarbons or mixtures thereof. This is best performed in two separate solutions which are then mixed together; but dissolving the resin and iodine also may be performed in one solution vessel. Alkali iodides normally are dissolved in alcohols or methyl glycol. The solvents used should be sufficiently volatile so that coatings of the solutions can be dried at temperatures below 40° C.

Good results are obtained when per 1 part by weight of curable resin, 0.005 to 0.4 part by weight of iodine or alkali iodide is used. Preferably, 0.01 to 0.1 part by weight of iodine or 0.05 to 0.3 part by weight of alkali iodide is used per 1 part by weight of resin.

The light-sensitivity of the iodine-containing resin coating is substantially increased by the addition of compounds with which iodine can form molecular complexes in which iodine serves as an electron acceptor. Suitable electron donors are, for example, aromatic hydrocarbons such as anthracene, pyrene, perylene, N-alkyl-carbazoles, etc. as well as macromolecular substances with such groups, e.g. condensates with aldehydes or vinyl polymers and ketones such as benzophenone, benzoin, benzil, etc. The listing is only to indicate the type of the suitable substances. Normally, 1 to 20 parts by weight of donor are used per part by weight of iodine. Several donors simultaneously may be present in the coating; particularly high light-sensitivity is often achieved thereby.

In addition to the sensitizing substances, in many cases non-hardenable binders also are added to the coatings, in order to increase their mechanical and chemical strength and, if necessary, to prevent sticking occurring before curing. As non-hardenable binders, there may be used the resins known in the lacquer industry, provided their acid number is not too high, which would result in prematurely curing the acid-curable resin. The quantity of binder added depends upon the desired properties of the coating; it may be larger than that of the curable resin. The quantity of the curable resin must be sufficient only to provide a difference in solubility between those portions of the coating in which the resin has not been cured and those portions of the coating in which such curing has been effected. For the preparation of the coatings, the solution of the curable resin which has been mixed with iodine or alkali iodide and, if desired, with the additives is applied to a suitable support by means of a known coating method, e.g. casting, whirl-coating, or spraying.

Suitable supports are the supports known in the printing art, e.g. paper, in particular water-impermeable papers provided with a hydrophilic precoat, also plastic films, as well as metallic supports, such as aluminum or zinc plates or foils.

In order to convert the light-sensitive material of the invention into a printing form, the copying coating is exposed under an original to a light source which emits shortwave light at a wavelength below 4000 A. (below 0.4 micron), e.g. a carbon arc lamp or a mercury vapor lamp. The material then is briefly heated in a drying cabinet or under an infrared radiator. The temperature employed should be between 60 and 160° C. and need not be maintained longer than two minutes. The material, while still warm or cooled to room temperature, is then decoated by wiping it over with a solvent in which the soluble resin is soluble. In this way, a positive image of the original is obtained which can be processed in a conventional manner into a printing form. A planographic printing plate is obtained by inking up with greasy ink, or a relief printing plate is obtained by etching. Sometimes it is advantageous to further harden the resin image, after development, by heating it to a higher temperature, e.g. 160 to 220° C. The copying coating of the invention is distinguished from the conventional light-sensitive colloid coatings or diazo coatings by greater-light-sensitivity.

The invention will be further illustrated by reference to the following specific examples in which the unit of volume is 1 ml. when the unit of weight is 1 g. The exposure times indicated apply for exposures under a glass disc. If not exposed through glass, substantially shorter exposure times are required.

EXAMPLE 1

In 200 parts by volume of toluene, there were dissolved 1 part by weight of a resin obtained by condensation of pyrene and formaldehyde in the presence of sulfuric acid, 10 parts by weight of an alkyd resin modified with styrene and having an acid number of 35 (Alkydal V 15, registered trademark), 0.25 part by weight of benzil, and 0.1 part by weight of iodine. The solution was mixed with 10 parts by volume of a 60 percent solution of a plasticized acid-curable urea resin (Beckurol 720, registered trademark) and whirl-coated onto an aluminum foil under yellow light. After drying with warm air, the coating was exposed, in contact with a positive film original, for 30 seconds to a 125 watt mercury vapor lamp at a distance of 50 cm. The plate then was heated for 30 seconds at 150° C. The exposed areas then were removed by wiping the plate with ethanol. By after-heating the plate for two minutes to 150° C., the image areas were fully hardened. The non-image areas were rendered hydrophilic by wiping the plate with a 3 percent phosphoric acid solution and the plate was preserved by coating with gum arabic. When used, the plate provided clean positive offset prints.

For the preparation of the above-mentioned condensation product from pyrene and formaldehyde, 202 g. of pyrene (1 mole) are suspended in 200 ml. of toluene and, with agitation, a mixture of 75 g. of formaldehyde (2.5 moles) in the form of a concentrated aqueous solution, and 80 ml. of concentrated sulfuric acid is added; the mixture is heated for two hours at 100° C. The aqueous phase then is removed, the toluene solution, for the purpose of removing the acid contained therein, is washed with aqueous soda solution and then with pure water, and the condensation product is precipitated from the thus purified toluene solution by the addition of methanol.

EXAMPLE 2

5 parts by weight of the styrene-modified alkyd resin of Example 1, 0.05 part by weight of iodine and 0.8 part by weight of technically pure pyrene were dissolved in 100 parts by volume of toluene. The solution was mixed with 5 parts by volume of the urea resin of Example 1 and coated onto an aluminum foil.

The coating was dried and exposed, in contact with a positive film original for 20 seconds to an 18 amp carbon arc lamp at a distance of 65 cm. and, as described in Example 1, processed into a planographic printing plate.

EXAMPLE 3

5 parts by weight of the alkyd resin of Example 1, together with 0.5 part by weight of iodine, 0.4 part by weight of pyrene and 0.15 part by weight of benzil were dissolved in 100 parts by volume of toluene. The solution was mixed with 5 parts by volume of the urea resin solution of Example 1 and cast onto an aluminum foil.

A planographic printing plate was prepared from the coated foil, as described in Example 1.

EXAMPLE 4

7.5 parts by weight of an oil-free alkyd resin having a softening point of 40 to 45° C., an acid number below 15 and a color number below 3 (Alkydal BG, registered trademark) as well as 0.6 part by weight of pyrene and 0.1 part by weight of iodine were dissolved in 100 parts by volume of toluene. After mixing with 7.5 parts by volume of the urea resin solution of Example 1, an aluminum foil was coated with the solution.

The dried coating was exposed under a positive film original for 90 seconds to an 18 amp carbon arc lamp at a distance of 65 cm., then heated for 45 seconds to 150° C. in a drying cabinet and then, as described in Example 1, processed into a planographic printing plate.

EXAMPLE 5

5 parts by weight of the styrene-modified alkyd resin of Example 1, 0.4 part by weight of anthracene and 0.06 part by weight of iodine were dissolved in 120 parts by volume of toluene. After the addition of 5 parts by volume of the urea resin solution of Example 1, the solution was whirl-coated onto an aluminum foil and dried with warm air.

For the preparation of an offset printing plate, the coated foil was exposed under a positive film original for 30 seconds to an 18 amp carbon arc lamp at a distance of 65 cm. and further treated as described in Example 1.

EXAMPLE 6

1.5 parts by weight of the styrene-modified alkyd resin of Example 1 together with 0.3 part by weight of anthracene and 0.04 part by weight of iodine were dissolved in 80 parts by volume of toluene and 5 parts by volume of butyl acetate. After the addition of 5 parts by volume of a 60 percent solution of an unplasticized acid-curable urea resin (Beckamin 801, registered trademark), the solution was whirl-coated onto an aluminum foil.

The dried coating was exposed and heated as described in Example 5, then removed in the exposed areas by means of a mixture of equal parts by volume of ethanol and acetone and processed into a planographic printing plate as described in Example 1.

EXAMPLE 7

10 parts by volume each of the urea resin solutions of Examples 1 and 6, 10 parts by weight of the styrene-modified alkyd resin of Example 1, 0.4 part by weight of anthracene, 0.2 part by weight of benzil, and 0.15 part by weight of iodine were dissolved in 160 parts by volume of toluene. An aluminum foil which had been roughened by brushing was coated with the solution.

For the preparation of a planographic printing plate, the coated foil was exposed, in contact with a positive film original, for 60 seconds to an 18 amp carbon arc lamp at a distance of 65 cm. and then processed as described in Example 1.

EXAMPLE 8

A solution of 5 parts by volume of the urea resin solution of Example 1, 5 parts by weight of the styrene-modified alkyd resin of Example 1, 0.05 part by weight of iodine, and 0.4 part by weight of pyrene in 100 parts by volume of toluene was cast onto an aluminum foil. The coated foil was exposed to light, as described in Example 7, and then heated for two minutes to 140° C. The exposed image areas were removed by wiping over with ethanol and the bared aluminum surface was rendered hydrophilic with dilute phosphoric acid.

EXAMPLE 9

A coating of 5 parts by volume of the urea resin solution of Example 1, 4 parts by weight of the styrene-modified alkyd resin of Example 1, 0.1 part by weight of benzil, and 0.05 part by weight of iodine was applied to an aluminum foil and dried. The coating was exposed to light, as described in Example 4, heated for 30 seconds to 150° C., removed in the exposed areas by means of ethanol, and finally rendered hydrophilic.

EXAMPLE 10

A planographic printing plate was prepared, as described in Example 9, with the exception that, instead of benzil, 0.2 part by weight of benzophenone was used.

EXAMPLE 11

In 100 parts by volume of toluene there were successively dissolved: 5 parts by volume of the urea resin solution of Example 1, 2.25 parts by volume of a 65 percent solution of a fatty acid-modified curable phenol resin of the resol type (Durophen 218 V, registered trademark), 0.2 part by weight of anthracene, 0.2 part by weight of benzil, and 0.07 part by weight of iodine. An aluminum foil was coated with the solution and the coated foil was converted into a planographic printing plate as described in Example 7.

EXAMPLE 12

Example 11 was repeated with a coating solution additionally containing 1.5 parts by weight of after-chlorinated polyvinyl chloride (Rhenoflex, registered trademark).

EXAMPLE 13

In 120 parts by volume of ethanol, 60 parts by volume of butyl acetate, and 10 parts by volume of o-dichlorobenzene, there were successively dissolved: 5 parts by weight of polyvinyl acetate having a medium molecular weight of 35,000 (Mowilith 20, registered trademark), 0.2 part by weight of benzil, 0.2 part by weight of anthracene, 0.1 part by weight of iodine, and 10 parts by volume of the urea resin solution of Example 1. An eloxated aluminum foil was coated with the solution.

The coated plate was exposed, in contact with a positive film original, for 90 seconds to an 18 amp. carbon arc lamp at a distance of 65 cm., then heated for 30 seconds to 150° C. in a drying cabinet, then wiped over with isopropanol until the exposed areas had been removed, and finally rended hydrophylic with 7.5 percent phosphoric acid and inked up with greasy ink.

EXAMPLE 14

A brushed aluminum foil was lacquered with a mixture of 12.5 parts by volume of the urea resin solution of Example 1, 10 parts by volume of the phenol resin solution of Example 11, and 100 parts by volume of toluene. After drying with warm air, a second solution was whirl-coated onto the coating, which, in 100 parts by volume of ethanol, contained 0.2 part by weight each of benzil and anthracene, 0.17 part by weight of polyvinyl acetate (as in Example 13), and 0.075 part by weight of iodine.

The double-coated plate was converted into a planographic printing plate as described in Example 13. Ethanol was used as the decoating agent for the unhardened coating areas.

EXAMPLE 15

5 parts by volume of the urea resin solution of Example 1 and 4 parts by volume of the phenol resin solution of Example 11 were diluted with 90 parts by volume of toluene. The mixture was mixed with a solution of 0.5 part by weight of LiI in 20 parts by volume of methyl glycol and whirl-coated onto an aluminum foil.

For conversion into a planographic printing plate, the coated foil was exposed, in contact with a positive film original, for 3 minutes to a 125 watt high-pressure mercury lamp. It then was heated for 60 seconds to 150° C., then wiped over with ethanol, rendered hydrophilic with dilute phosphoric acid, and finally inked up with greasy ink.

It will be obvious to those skilled in the art that many modifications may be made within the scope of the present inventions without departing from the spirit thereof, and the invention includes all such modifications.

What is claimed is:

1. Light-sensitive material comprising a support having a light-sensitive coating thereon, the latter containing a resin which is a condensate of a compound selected from the group consisting of an aldehyde or a ketone with a compound selected from the group consisting of urea, melamine or a phenol; a member of the group consisting of free iodine and an alkali metal iodide; and an electron donor selected from the group consisting of anthracene, pyrene, perylene, N-ethyl-carbazole, a pyrene-formaldehyde condensate, benzophenone, benzoin, and benzil.

2. Light-sensitive material according to claim 1 in which the coating also contains a neutral non-hardenable resin.

3. A process for the preparation of a printing plate which comprises exposing a supported light-sensitive coating containing a resin which is a condensate of a compound selected from the group consisting of an aldehyde or a ketone with a compound selected from the group consisting of urea, melamine or a phenol; and a member of the group consisting of free iodine and an alkali metal iodide; to light under a master, heating the coating to a temperature in the range of about 60 to 160° C., and removing the exposed areas of the coating from the support by treatment of the coating with a solvent in which the resin is soluble.

4. A process according to claim 3 in which the light-sensitive coating also contains an electron donor selected from the group consisting of anthracene, pyrene, perylene, N-ethyl-carbazole, a pyrene-formaldehyde condensate, benzophenone, benzoin, and benzil.

5. A process according to claim 3 in which the coating also contains a neutral non-hardenable resin.

References Cited

UNITED STATES PATENTS

| | | | |
|---|---|---|---|
| 1,574,357 | 2/1926 | Beebe et al. | 96—115 XR |
| 1,587,269 | 6/1926 | Beebe et al. | 96—115 |
| 1,587,270 | 6/1926 | Beebe et al. | 96—115 |
| 1,604,674 | 10/1926 | Beebe et al. | 96—115 |
| 1,820,593 | 8/1931 | Beebe et al. | 96—115 XR |
| 2,544,905 | 3/1951 | Van Deusen | 96—115 XR |
| 3,046,125 | 7/1962 | Waiver | 96—115 |

DAVID KLEIN, Primary Examiner

U.S. Cl. X.R.

96—35.1, 115